United States Patent [19]

Jones

[11] 4,013,865

[45] Mar. 22, 1977

[54] METAL HONEYCOMB WELDING APPARATUS AND METHOD

[75] Inventor: Everett E. Jones, Wichita, Kans.

[73] Assignee: The Boeing Company, Seattle, Wash.

[22] Filed: July 29, 1974

[21] Appl. No.: 492,497

[52] U.S. Cl. .......................... 219/117 HD; 219/93
[51] Int. Cl.² ....................................... B23K 11/14
[58] Field of Search ...................... 219/93, 117 HD

[56] References Cited

UNITED STATES PATENTS

| | | | |
|---|---|---|---|
| 2,299,776 | 10/1942 | Weightman | 219/117 HD |
| 2,820,882 | 1/1958 | Johnson | 219/117 HD |
| 2,927,991 | 3/1960 | Schoelz | 219/117 HD |
| 3,064,116 | 11/1962 | Thomas et al. | 219/117 HD |
| 3,283,118 | 11/1966 | Runkle | 219/117 HD |

Primary Examiner—Bruce A. Reynolds
Assistant Examiner—N. D. Herkamp
Attorney, Agent, or Firm—Christensen, O'Connor, Garrison & Havelka

[57] ABSTRACT

Welding apparatus for making metal honeycomb core panels by welding together preformed corrugated metal strips is disclosed. The assembled portion of the core panel is positioned by vertical finger electrodes on a horizontal base with the core panel workpiece end located along the line of a welding station extending across the base. The finger electrodes are arranged in two rows extending parallel to the welding station line, one row being insertable into the honeycomb core from above and the other being insertable into the core from below, each row also being movable from a first workpiece engaging position to a second welding position with one edge thereof along a welding station line. Welding heads, each including a welding element, are movable to and from the welding station. A corrugated metal strip is detachably held onto and carried to the welding station by the welding heads. The strip is positioned at the welding station with its outer apices and those apices on the workpiece end of the core panel engaging each other at nodes along the welding station line. The welding elements are elongated members having edge faces, the profiles of which register with the strip inner apices when advanced to the welding station. The welding elements are particularly useful with strips formed with tit-like projection arrays on their edge faces. These projection arrays make up the points of engagement between the welding elements and the finger electrodes, across the honeycomb nodes. The welding element longitudinal edge faces force the rearwardly-directed apices of the strip into contact with the forwardly-directed apices of the assembled honeycomb core forming a node so that welding current passes between each welding element and finger electrode through all the projections of one array. A weld joint made up of multiple spot welds, each of which is formed about one projection, is formed simultaneously between each mutually engaging pair of core panel and strip apices. One, two, or more such weld joints may be formed simultaneously, depending upon the number of welding elements. The welding elements thereafter can be retracted, moved parallel to the welding station line, and advanced to form welds at other nodes along the welding station line. When all desired welds are completed along the welding station line, the welding station positioned row of finger electrodes is withdrawn from the honeycomb core, the core advanced by moving the workpiece engaging positioned row of finger electrodes into the welding station position and emplacing the other row into the workpiece engaging position. The welding cycle is then repeated.

12 Claims, 22 Drawing Figures

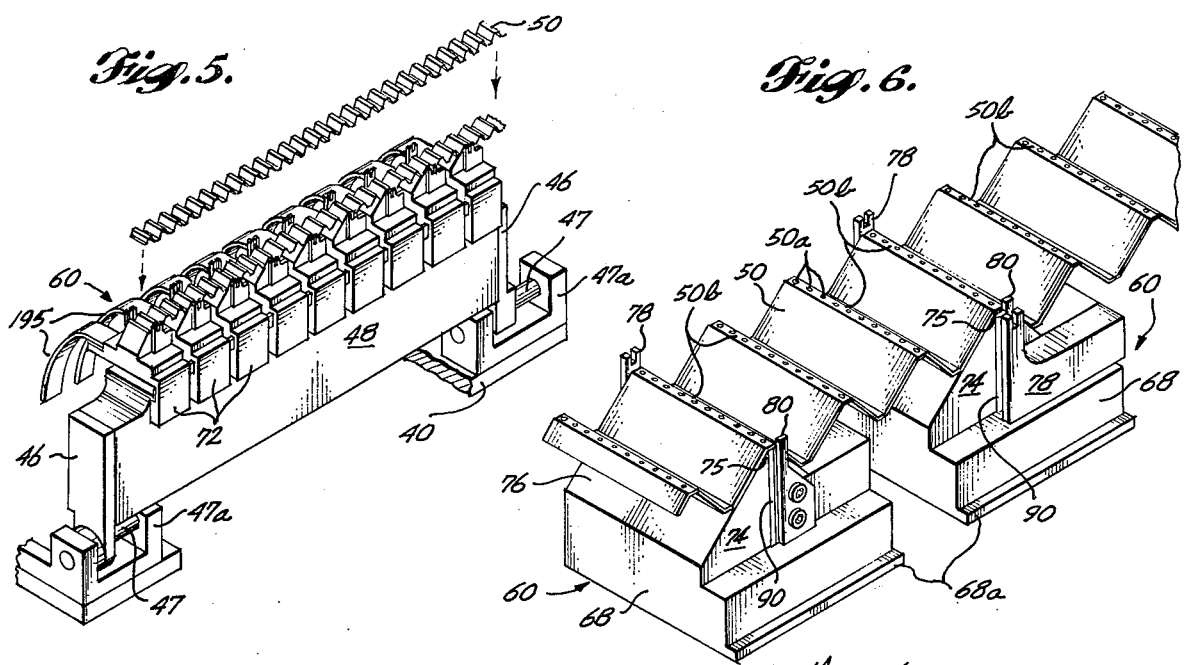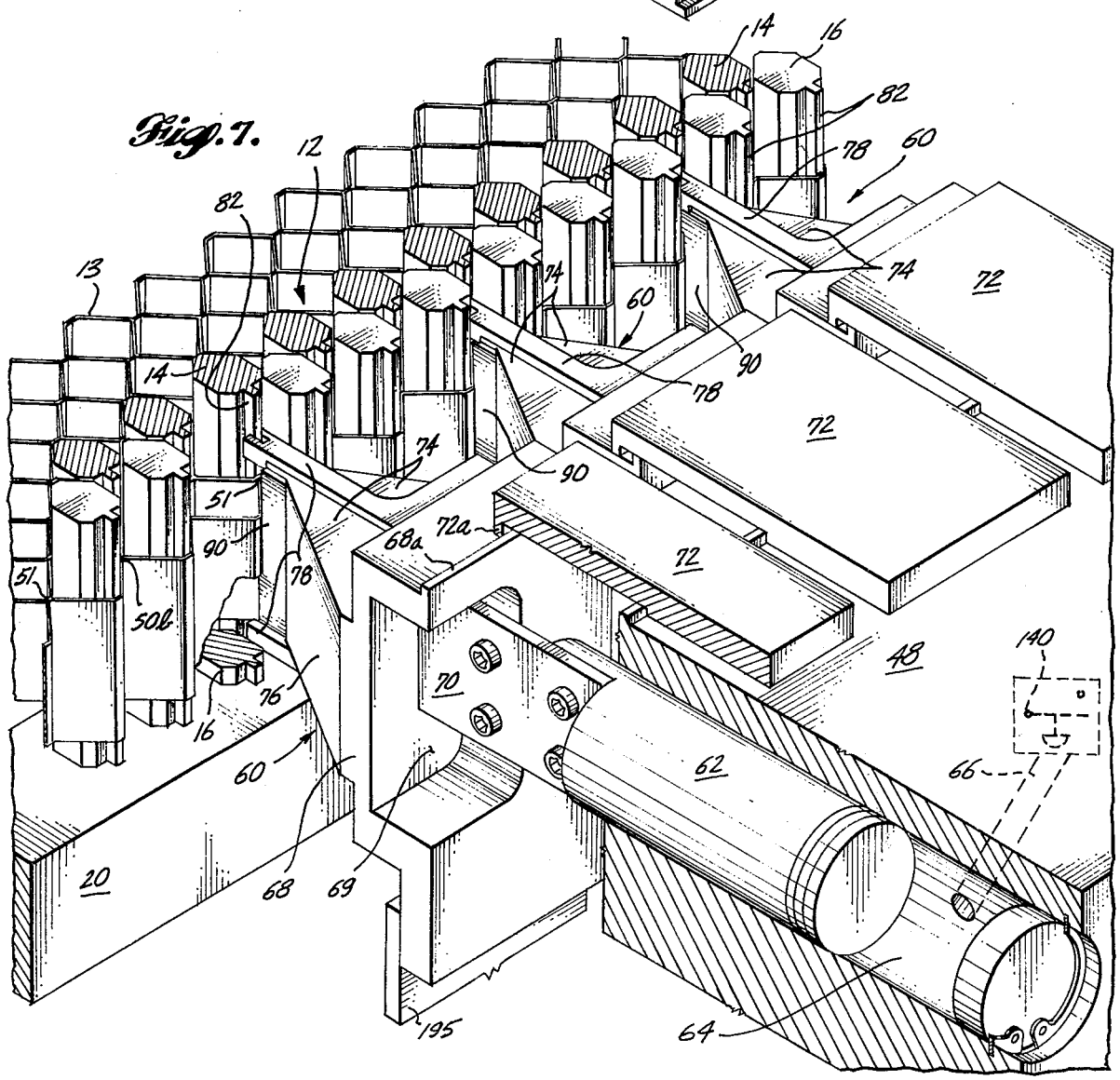

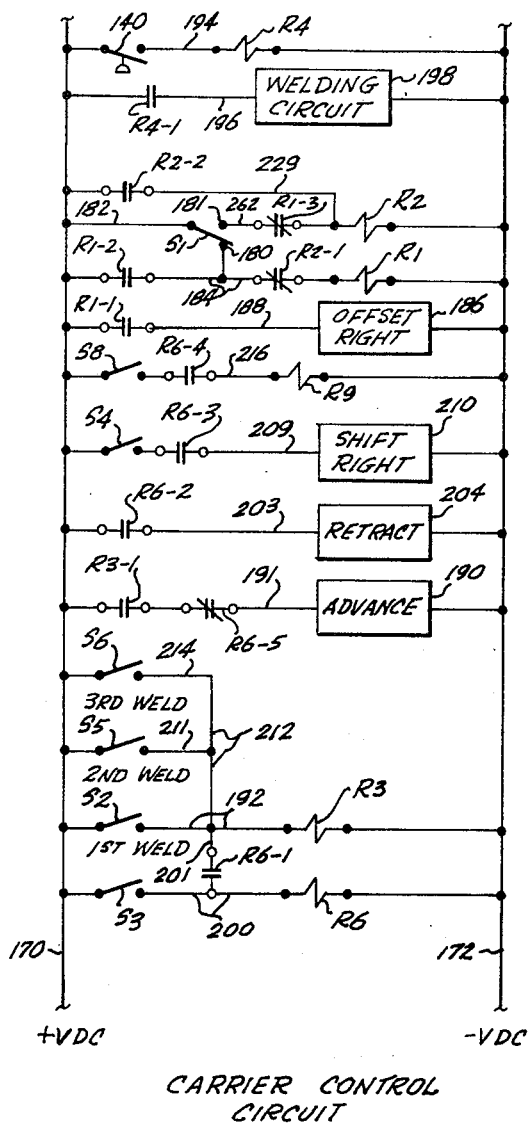
Fig. 14. CARRIER CONTROL CIRCUIT
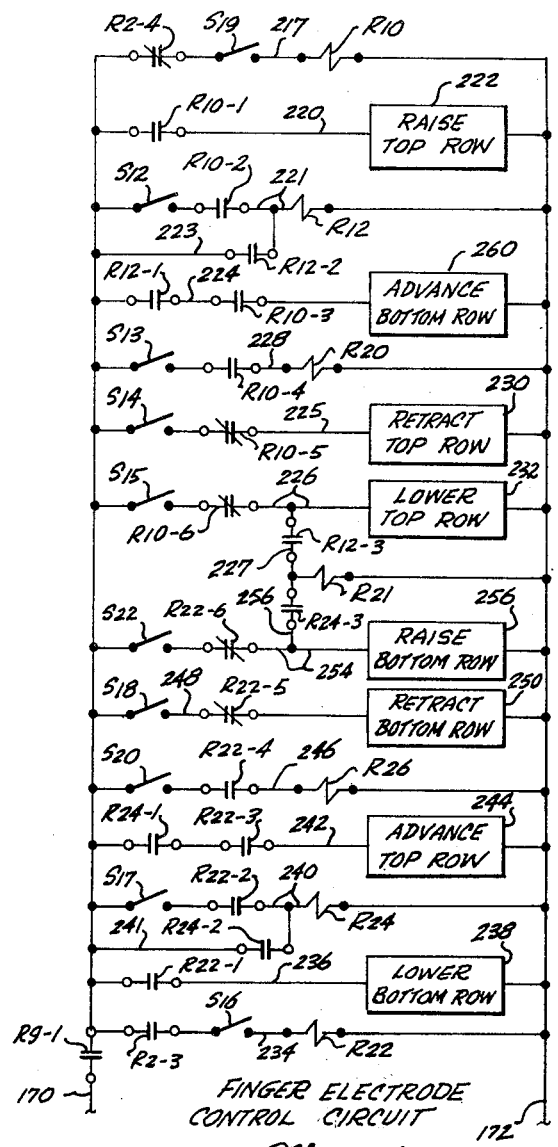
Fig. 15. FINGER ELECTRODE CONTROL CIRCUIT
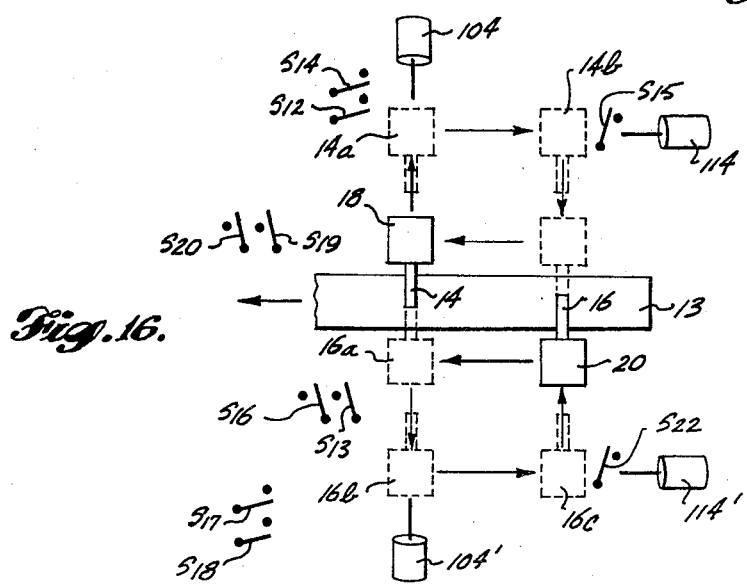
Fig. 16.

METAL HONEYCOMB WELDING APPARATUS AND METHOD

BACKGROUND OF THE INVENTION

This invention relates to welding apparatus for making metal honeycomb core panels.

Welding apparatus for making metal honeycomb typically utilize probe-like welding elements adapted to make one spot weld at a time between the outer nodes of a honeycomb core, as is generally illustrated and described in U.S. Pat. No. 2,927,991 to Schoelz. (The word "outer nodes" is used herein to describe those nodes adjacent the edge of a honeycomb core panel which are formed by engagement of the inwardly directed apices of a corrugated metal sheet with outwardly directed apices of a partly formed honeycomb core.) Inasmuch as a typical weld joint across each node is made up of many spot welds, the prior art welding process is time consuming, inefficient, and costly. Wheel type electrodes are not significantly faster than probe type electrodes. Both probe and wheel type electrodes require complicated positioning and control equipment which increases installation and operating costs of the apparatus.

Metal honeycomb welding apparatus also typically includes one or more generally parallel rows of substantially vertical finger electrodes which may be inserted through the honeycomb core spaces of the core panel to position it and successive strips as generally illustrated and described in U.S. Pat. No. 2,821,616 to Spott. The Spott finger electrodes lend structural simplicity and increased reliability to the apparatus because they perform multiple functions, one of which is to advance the assembled core out the rear of the apparatus as their relative forward and rear positions are being interchanged subsequent to welding a strip to the end of the core panel. One drawback to the Spott apparatus and other similar prior art welding devices is that the core panel is assembled from a planar strip formed into the desired corrugated shape using the finger electrodes as corrugated die sections. This is undesirable because the completed core panel is likely to have irregular cell configurations and/or have nonplanar faces due to strip misalignment caused by the shaping process.

It is an object of the present invention, therefore, to overcome or mitigate the disadvantages of these and other prior art welding apparatus for making metal honeycomb from previously formed corrugated metal strips by providing a method and apparatus for producing substantially simultaneously multiple spot welds across one, two or more nodes formed by engagement of preformed corrugated strips with an exposed workpiece edge of a honeycomb core being constructed.

Another object is to provide efficient, economical welding apparatus for making metal honeycomb from corrugated metal strips utilizing one, two or more improved welding elements, each of which when used with strips formed for the purpose produces substantially simultaneously multiple spot welds across nodes formed by interengagement of corrugated metal strips and honeycomb formed therefrom.

Another object is to provide welding apparatus for making high quality metal honeycomb from preformed corrugated metal strips using two interchangeable rows of finger electrodes cooperable with an array of welding elements. A related object is to provide a simplified, reliable control system for mutually positioning the finger electrodes and the welding elements relative to each other and to the core panel under fabrication.

An additional object is to provide welding apparatus for making metal honeycomb from preformed corrugated strips having positioning means on a series of welding heads for positioning the preformed corrugated strips relative to an electrical welding element on each head, and having registry and advancing means to emplace the corrugated strip against the end of the core panel under fabrication whereby a honeycomb structure core panel is formed.

SUMMARY OF THE INVENTION

In accordance with principles of this invention, welding apparatus for making metal honeycomb from corrugated metal strips is provided. The welding apparatus includes a base on which the core panel under fabrication is placed and advanced across with its workpiece end substantially coincident with the line of a welding station extending across the base. The apparatus includes means for positioning a strip against the end of the core panel with its rearwardly-directed apices in engagement with forwardly-directed apices on the workpiece end of the core panel. One, two or more electrical welding elements are supported from the base and are movable in the plane of the base as well as rotatable into a strip receiving position. Each welding element has a face having a profile substantially conforming to the outline of at least one rearwardly-directed apex of the strip with which it is engageable. The welding elements are movable to and from an advanced position in which their faces front along the welding station and each engageably back a rearwardly-directed apex of the corrugated strip. The core panel and strip apices form nodes and are welded together by welding current passing between the welding elements and finger electrodes placed within the cells of the honeycomb structure at the workpiece end thereof.

In accordance with further principles of this invention, the welding elements are constructed and arranged on the base so that the faces of their longitudinal edges front along the welding station line and engage the rearwardly-directed apices of the strip in the advanced position. The width of their longitudinal edge faces, of course, may be varied. The welding elements are disposed in a generally rectilinear array in which their longitudinal edge faces are substantially coincident with a common plane. As an array, they are movable jointly to and from the advanced position. The welding element array is further movable parallel to the welding station line to engage and weld together additional mutually engaging core panel and strip apices. The number of times the welding element array is so moved depends, of course, on the number of welding elements in the array, the width of the core panel, and the number of weld joints to be made. While, preferably, the welding apparatus is operated automatically by the control system of this invention, it may be operated manually, if desired.

According to still further principles of the invention, the electrodes for establishing electrical contact with the core panel apices are made up of two parallel rows of substantially vertical finger electrodes extending parallel to the welding station line. The finger electrodes have vertical ribs of a form generally similar to the welding elements. The finger electrode rows are vertically interengageable independently of each other with the core panel. One row may be inserted and withdrawn from the honeycomb core cells forming the workpiece edge of the core panel. This row of electrodes serves as the electrical contacts with the forwardly-directed apices of the core panel. The other row is positioned forwardly of the one row to intervene between the core panel apices. Preferably, these two rows of finger electrodes are mounted on the base so that their relative forward and rear positions may be interchanged by advancing the relatively forward row toward the rear of the apparatus with the other row withdrawn from the core panel. The core panel is thus incrementally advanced out the rear of the apparatus. Thereafter, the other withdrawn row is reinserted in the relatively forward position in preparation for the next welding cycle. Conventional noninterchangeable finger electrodes, of course, may be used.

The welding apparatus of this invention is particularly useful in joining corrugated strips wherein one of the joining surfaces has raised projection arrays thereon which serve as the pressure points for generating the local spot welds. It will be appreciated that the speed in which the individual strip and core panel apices are joined together into a node by weld joints made up of such spot weld arrays is substantially increased with corresponding reduction in the cost of core panels produced. One, two, or more weld joints may be formed at one time depending on the number of welding elements. The number of projections making up each array (and correspondingly the number of spot welds formed by each array) and the disposition of the projections on the joining surfaces may vary, of course, depending upon the thickness of the core panel, the desired strength of the weld joints, and other factors.

These and other features, objects and advantages of the present invention will become more fully evident from the following description thereof by reference to the accompanying drawings.

BRIEF DESCRIPTION OF THE DRAWINGS

FIG. 5 is a fragmentary perspective view of the electrode carrier of the apparatus of FIG. 1;

FIG. 6 is generally similar to FIG. 5 on expanded scale with a part broken away;

FIG. 7 is a fragmentary perspective view partly in section and on expanded scale with parts broken away depicting the apparatus of FIG. 1 in position for welding;

FIGS. 14 and 15 are circuit diagrams of the electrical control system of this invention;

FIGS. 16–19 are schematic outlines of the apparatus of FIG. 1 during operation.

DETAILED DESCRIPTION OF THE PREFERRED EMBODIMENT

Figure 1:
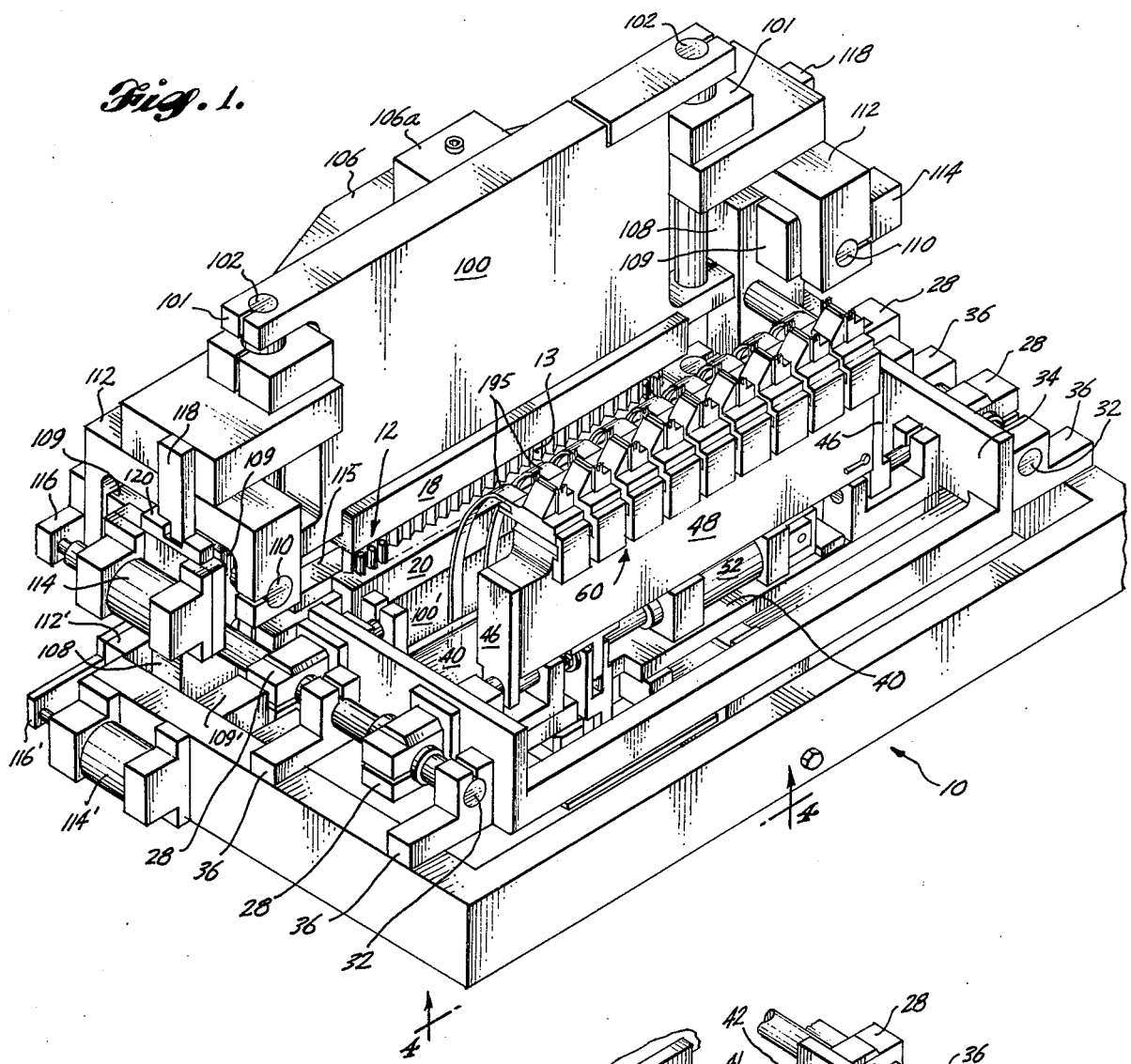
FIG. 1 is a front perspective view of welding apparatus according to the present invention.

Welding apparatus according to the present invention is illustrated in FIGS. 1–22 of the drawings, wherein like parts bear like reference numerals. Referring to FIG. 1, a generally horizontal main base frame 10 supports a plurality of vertical finger electrodes 12 extending along the line of a welding station positioned above the base frame 10. The line of the welding station extends transversely to the direction of advance of a core panel 13 being fabricated progressively by welding successive corrugated metal strips to the end thereof. The finger electrodes are interengageable with the honeycomb core cells of the core panel 13 and serve to position it on the base frame with its end substantially coincident with the welding station line. The main body of the core panel 13 rests upon a rear table 26 (FIG. 3) along which it is advanced incrementally out the rear of the apparatus by the finger electrodes 12, as will be described hereinafter. As shown most clearly in FIG. 8, the finger electrodes 12 are made up of two mutually parallel upper and lower rows 14 and 16 disposed opposite each other with the end of the core panel 13 therebetween. The finger electrode upper and lower rows 14 and 16, respectively, project downwardly and upwardly toward the upper and lower faces of the core panel 13. They are respectively mounted from upper and lower transverse manifolds 18 and 20 movable vertically and horizontally.

Figure 2:
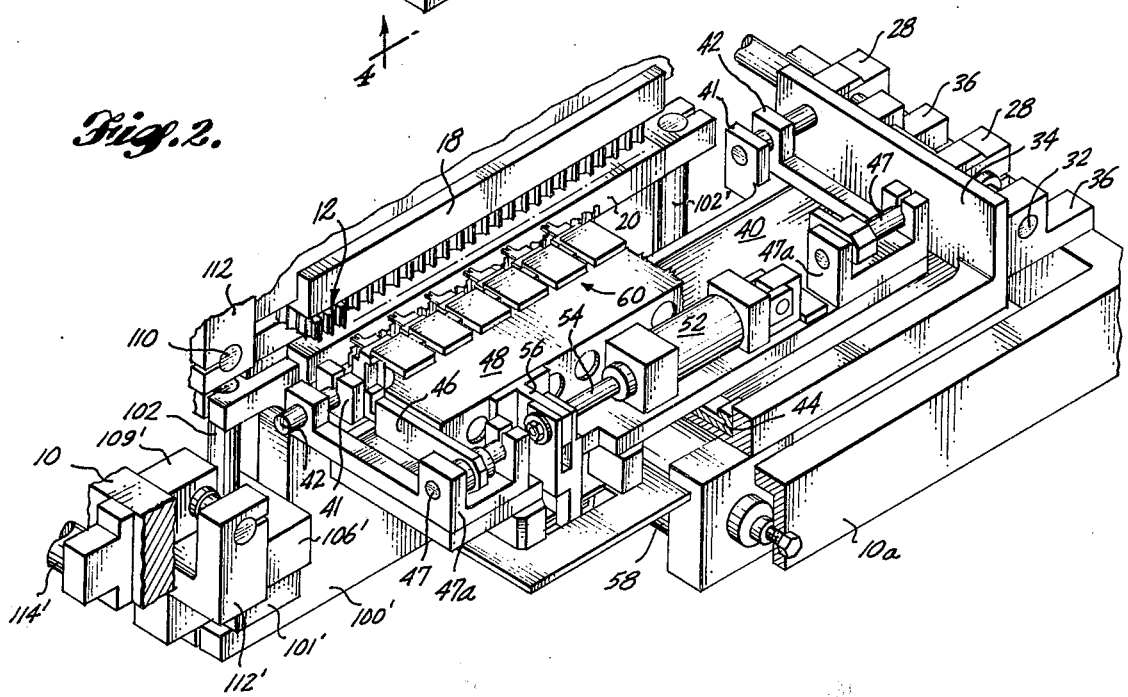
FIG. 2 is a fragmentary perspective view of the apparatus of FIG. 1.

As shown in FIGS. 1–4, a horizontal table 34 is slidably supported from the base frame 10. Inner and outer way guides 28 and 36 (FIG. 1) mounted upon the sides of the table 34 and the base frame 10, respectively, are slidably interconnected by horizontal longitudinal way rods 32 therebetween. The table 34 is longitudinally movable along way rods 32 relative to the base frame 10 by a double-acting cylinder 58 (see FIG. 2) mounted between the underside of the table 34 and the base frame front 10a. The table 34 in turn supports a horizontal web 40. Rear corner way guides 41 (FIG. 2) upstanding on the web are slidably interconnected with the table by rear horizontal transverse way bars 42. The front portion of the web is supported on the table 34 by a tongue and groove connector 44 therebetween (FIG. 2). The web 40 is transversely movable relative to the table 34 by a double-acting offset cylinder 45 (FIG. 4) mounted on the underside of the table 34 and operatively engaged with a flange 45a dependedly mounted from the web 40. An elongated electrode carrier 48 (FIGS. 1 and 2) is pivotally supported from the web 40 by an arm 46 on each end of the carrier. The arms are pivotally interconnected to the web 40 by transverse elongated pivot pins 47 (FIG. 2) mounted between U-shaped brackets 47a upstanding upon the forward upper surface of the web 40. The carrier 48 is manually rotatable between an upright loading position (FIG. 1) and a horizontal position (FIG. 2). The carrier 48 is further transversely slidably movable relative to the web 40 along the pivot pins 47 by a double-acting shifting cylinder 52 mounted on the web 40. The shifting cylinder 52 is connected to the carrier 48 by a rigid connecting rod 54 which moves a T-shaped flange 56 secured to the bottom of the carrier 48, as shown (FIG. 2). The coupling between the flange 56 and the rod 54 permits relative rotation therebetween.

Figure 3:
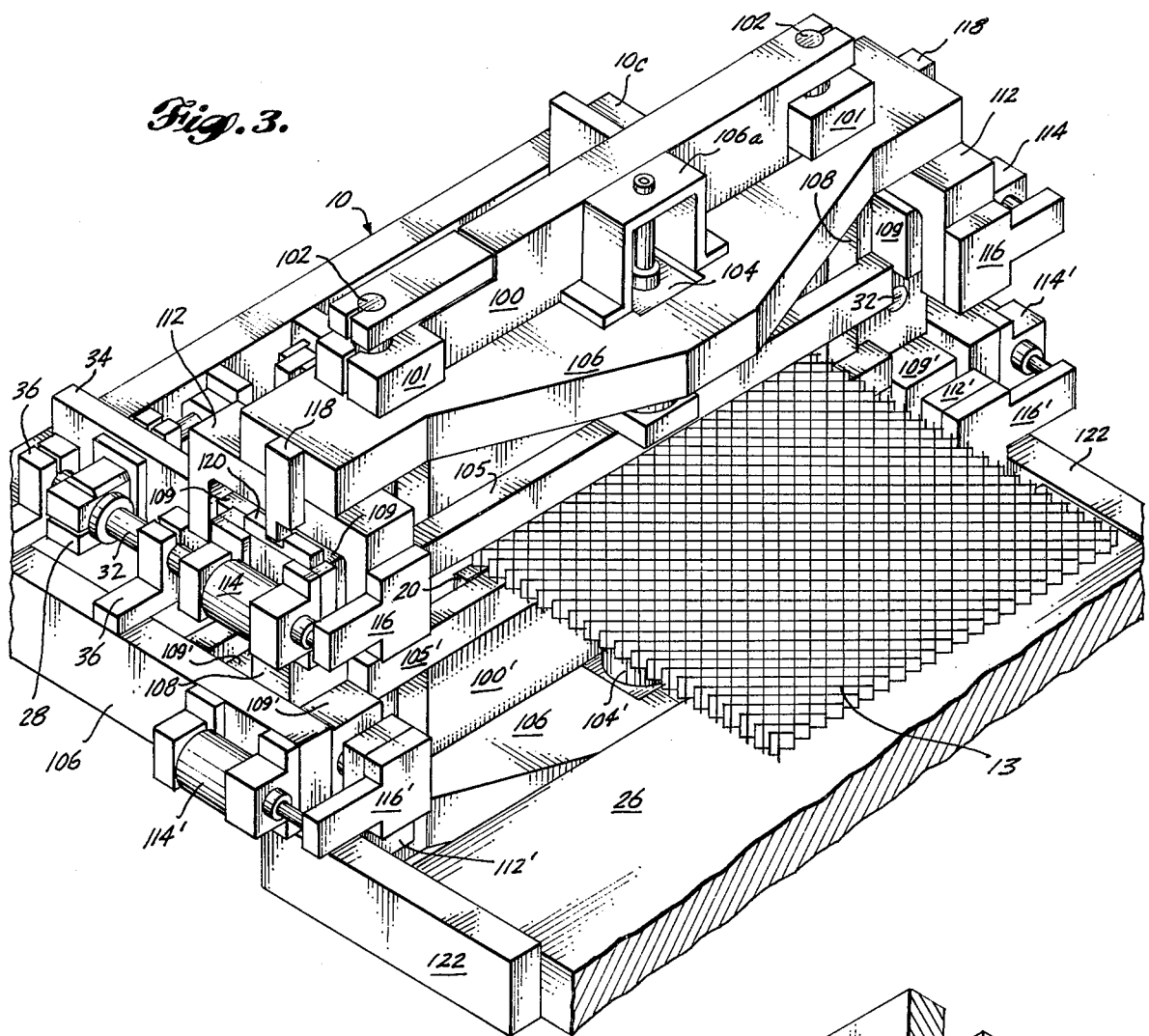
FIG. 3 is a rear perspective view of the apparatus of FIG. 1.

As best shown in FIG. 3, the welding apparatus is mounted upon the supporting table 26 by a pair of side arms 122 extending rearwardly from the left and right sides 10b and 10c of the main frame 10. The apparatus when so mounted extends outwardly from the edge of the table 26 to facilitate access by a suitable strip feeding equipment (not shown) at the loading position (FIG. 1) of the carrier.

Referring now to FIGS. 5–7, the carrier 48 supports a series of welding heads 60 each including a separate electrical welding element. In the preferred embodiment shown, there are nine such welding heads although the number may be varied depending upon the width of the assembled core and the desired number of weld joints to be made during each welding cycle. As best shown in FIG. 7, the welding heads, which are generally similar, project outwardly at evenly spaced intervals from the end of the carrier 48. They are supported on pneumatically or hydraulically actuated pistons 62, the extended or contracted positions of which (and the resistance to forceable contractive movement thereof) may be varied by increasing or decreasing the fluid pressure in respective pressure chambers 64 within the carrier 48. These chambers are connected to a source of pressure fluid by suitable fluid lines 66 depicted in broken lines. Each welding head includes a generally square main body 68, the back of which forms a laterally opening U-shaped cavity 69. Electrically nonconductive tie bars 70 are connected between the sidewalls of the cavities 69 and the pistons 62. The tie bars 70 electrically insulate the welding heads from the carrier 48. Limit plates 72 project outwardly from the carrier and terminate in downwardly projecting lips 72a which are engageable with generally similar upwardly projecting lips 68a formed on the inner edge portions of the welding head main bodies 68. The limit plates 72 limit forward projecting movement of the welding heads 60 caused by extension of the pistons 62.

The illustrated welding heads each include shoulders 74 of generally triangular cross-sectional configuration (see FIG. 7) upstanding from their main bodies 68. The shoulder outer faces 76 (FIG. 6) are inclined relative to the welding head main body and terminate in a generally flat outer edge or apex 75. A pair of opposed outwardly projecting guide arms 78 (one not shown in FIG. 6) also are upstanding from the main body 68 adjacent each end of the shoulder 74. The guide arms 78 terminate in fork-like notches which are engageable with the finger electrodes. Each welding head further includes a resilient finger 80 secured to one end of the end of the shoulder 74 and disposed to project outwardly parallel to the guide arms 78. One of these fingers has been fully exposed for illustrative purposes in FIG. 6 by breaking away the guide arm 78 covering it.

The welding elements of this invention will now be described by referring to FIGS. 7 and 8 in which they are exaggerated for clarity and to FIG. 6 in which they are depicted in normal scale. Each welding element 90 is comprised of an elongated electrically conductive member essentially flat in cross-sectional configuration terminating in a substantially flat longitudinal edge face 92 (see FIG. 8). As best shown in FIG. 6, the illustrated welding elements 90 are mounted centrally and generally bisect the welding head shoulders 74. Each welding element is electrically interconnected with a flat power lead 195 (see FIGS. 1 and 5) one of which is secured to the welding head main body 68 by means not shown.

The welding element longitudinal edge faces 92 project outwardly from the welding head shoulder outer edges 75 between and parallel to opposed pairs of guide arms 78. The fork-like ends of the guide arms 78 extend outwardly beyond the welding element longitudinal edge faces 92.

The finger electrodes 12 and their mounting will now be described in detail by referring to FIGS. 1–3. The finger electrode upper row 14 is movable by the upper manifold 18 both vertically and horizontally. (The upper row 14 is not shown in FIGS. 1–3 because it is interengaged with the core panel as depicted in FIG. 7.) Vertical movement is effected by an upper frame 100 from which the upper manifold 18 is dependedly mounted. The ends of the upper frame 100 form outwardly opening U-shaped cavities through which extend vertical way bars 102. Vertical way guides 101 slidably interconnected with the vertical way bars 102 are mounted on a horizontal upper brace 106, relative to which the upper frame 100 is moved vertically by a double-acting upper vertical cylinder 104 (FIG. 3). The upper cylinder 104 is mounted between a stripper bar 105 secured to the bottom edge of the upper frame 100 and an inverted U-shaped bracket 106a upstanding on the upper brace 106. It is the upper brace 106 which effects horizontal movement of both the upper frame 100 and finger electrode upper row 14. The upper brace 106 is slidably supported from vertical corner beams 108 upstanding on the rear corners of the main frame 10. Inverted U-shaped brackets 112 depending from the ends of the upper brace 106 are slidably interconnected with front and rear horizontal way guides 109 mounted on the corner beams 108 by horizontal longitudinal way bars 110 (see FIG. 1) extending therebetween. The upper brace 106 is slidably movable horizontally along the way bars 110 by a pair of double-acting upper horizontal cylinders 114 mounted on the corner beams 108 and engaging T-shaped rear brackets 116 (see FIG. 3) on the brackets 112. Spacer templets 118 secured to each end of the upper brace 106 projected downwardly and are engageable with the ends of longitudinal notches in stop members 120 on the corner beams 108 to limit horizontal movement of the upper brace 106. The lower manifold 20 mounting is generally similar and is not separately described herein with reference numerals; but instead like parts of which are designated with the same reference numerals, primed.

Figure 17:
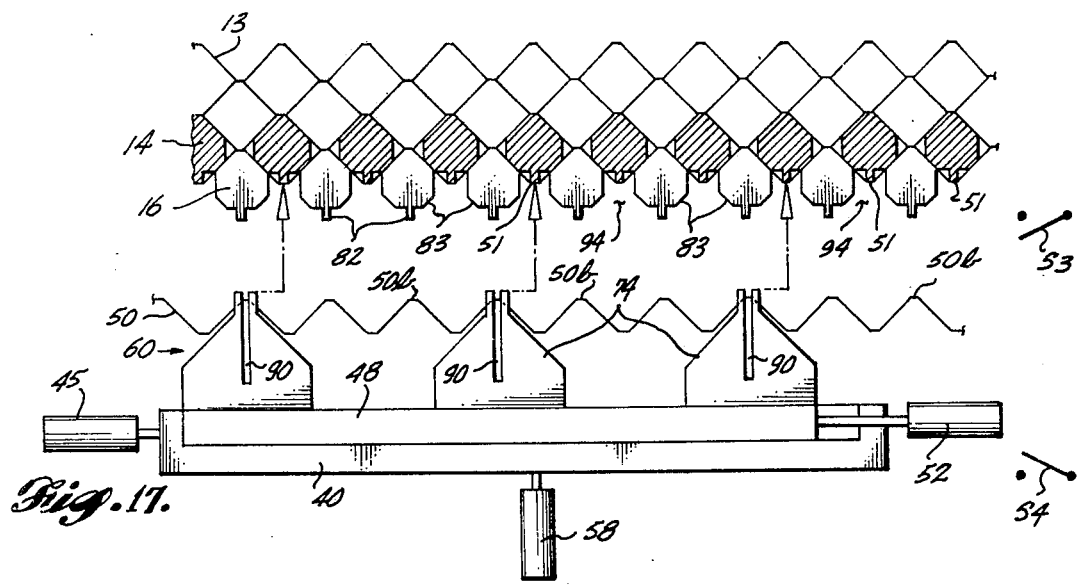
Figure 18:
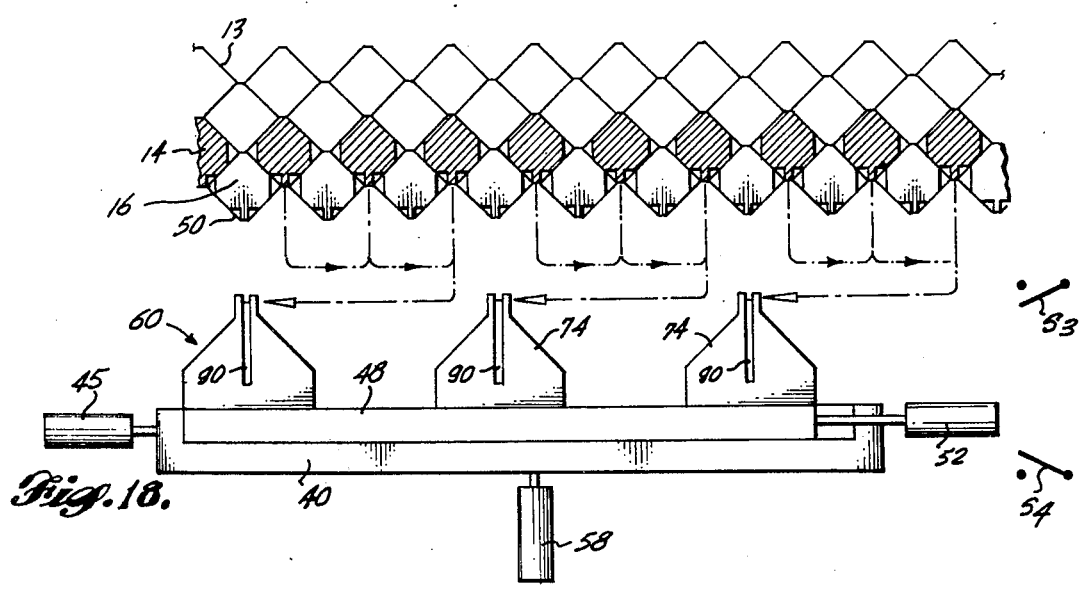
Figure 19:
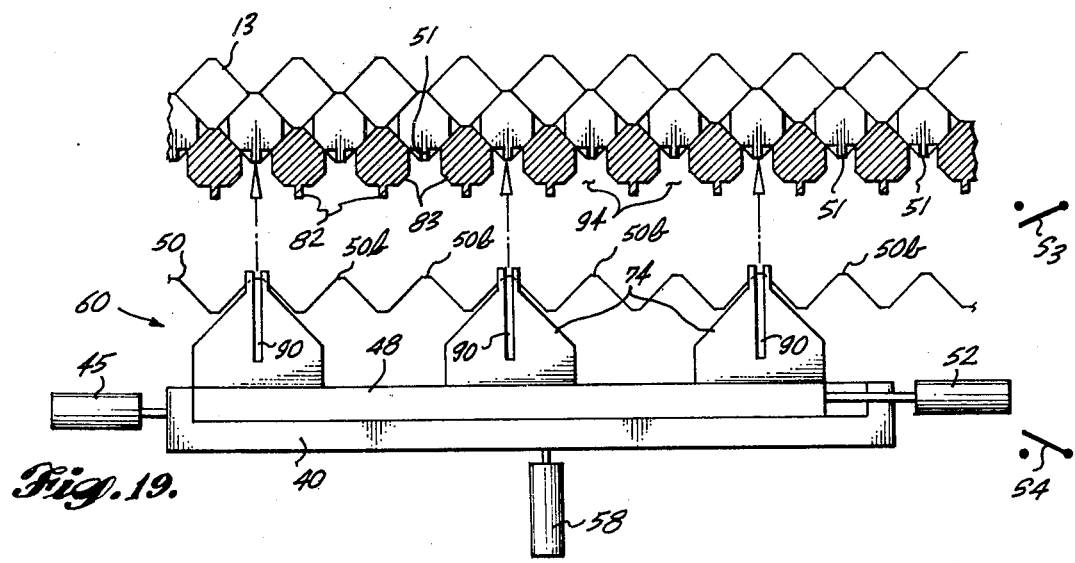

As most clearly shown in FIGS. 8 and 17–19, the cross-sectional outlines of the finger electrodes substantially register with the honeycomb core spaces of the core panel 13. The finger electrodes are formed so that by vertical movement perpendicular to the plane of the core panel 13, they can be inserted into and withdrawn from the core panel core spaces. This form also allows them to be interposed between the outer apices on the end of the core panel (see FIGS. 17 and 19). A vertical rib 82 projects from the forward central portion of each finger electrode between forward oppositely inclined faces 83 (FIGS. 17 and 19). It is with this rib that the notched ends of the guide arms 78 are engaged once the carrier has been moved to its advanced position, as shown (FIG. 7). The core panel is elevated by the rear table 26 so that there is sufficient vertical clearance between the upper and lower manifolds 18 and 20 and the upper and lower edges of the core panel end for the guide arms 78 to so engage the finger electrode ribs 82 (see FIG. 7). This engagement tends to align the welding elements 90 with the finger electrode ribs 82.

Figure 8:
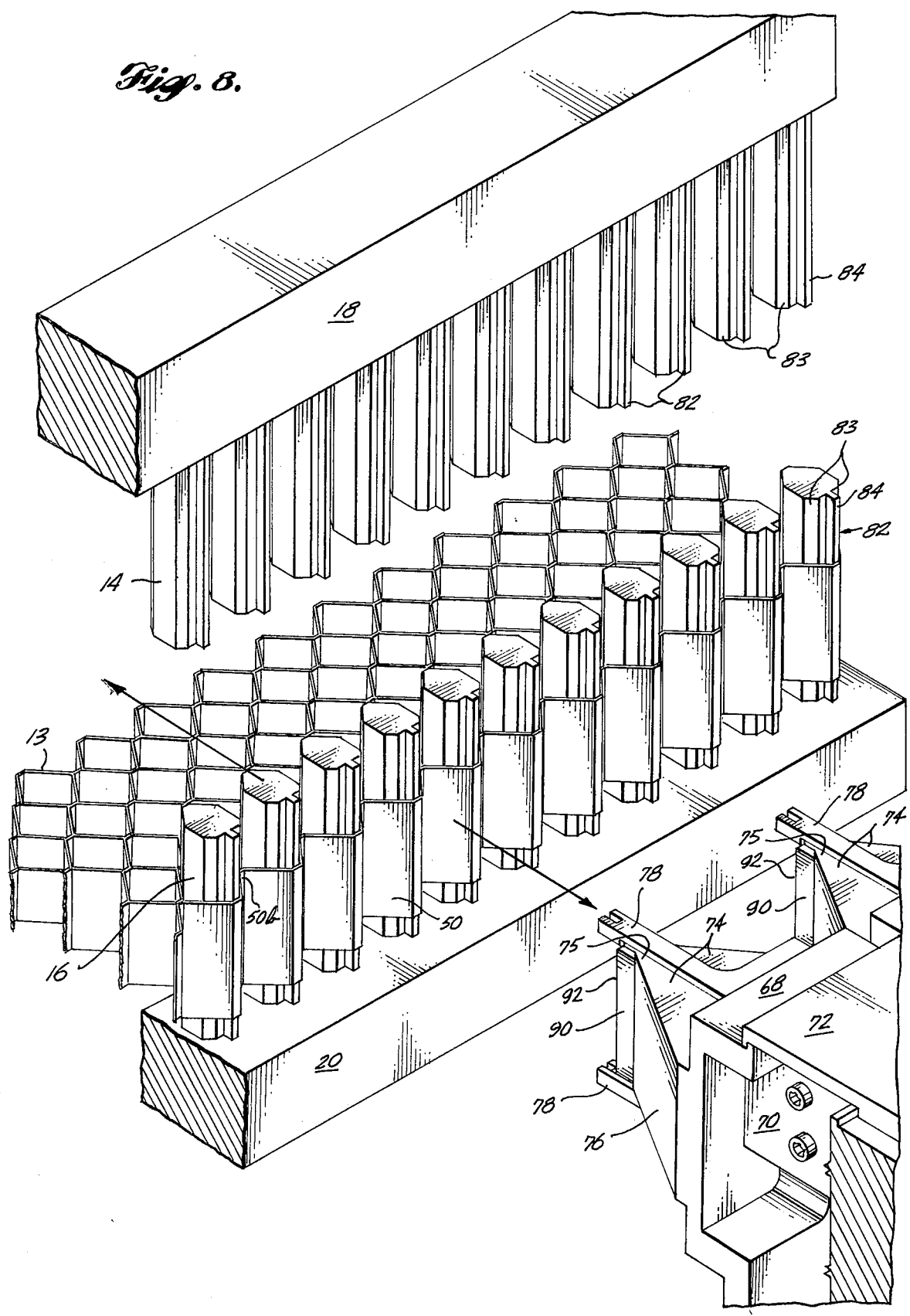
FIG. 8 is generally similar to FIG. 7 depicting the apparatus of FIG. 1 in position for advancing the core panel.

Still referring to FIG. 8, the finger electrode ribs 82 are of elongated form generally similar to that of the welding elements 90. The dispositions of the ribs 82 on the finger electrodes 12 is such that their longitudinal, vertical edge faces 84 front along the welding station line and engageably back the outer apices of the end of the core panel 13 when they are inserted into the transverse row of core spaces defined by and immediately behind the core panel apices. (This position is occupied by the lower row 16 in FIG. 8).

OPERATION

Operation of the welding apparatus according to the present invention will now be described with reference to the various drawings. The welding elements 90 collectively make up a generally rectilinear array. They are disposed in mutually parallel relationship with their longitudinal edge faces 92 substantially coincident with a common plane when the welding heads are in essentially the same extended or contracted positions on the carrier 48. The welding elements are movable jointly as an array between an advanced position (FIG. 7) in which their longitudinal edge faces 92 front along the welding station line and a retracted position longitudinally removed therefrom.

As depicted in FIG. 5, a preformed corrugated strip 50 is placed on the welding element array with the carrier 48 in its upright loading position (FIG. 1). The strip 50 is correctly positioned in the now horizontal welding element common plane parallel to the welding station line by the welding heads 60 which engage every third apex 50b thereof (see FIG. 6), The cross-sectional configurations of the welding head shoulders 74 are generally similar to the corrugation configuration of the strip 50. The shoulder inclined faces 76 thus respectively engage an inclined inner face of the strip 50 to thereby longitudinally position it onto the array. The resilient fingers 80 engage one longitudinal edge of the strip 50 and force it against the opposite guide arm 78. The strip is resiliently gripped therebetween and is detachably held on the welding heads. The opposed pairs of guide arms 78 and these resilient fingers also transversely position the strip relative to the welding elements 90. Once correctly positioned, the strip apices 50b oppose and are engageably backed by the welding element longitudinal edge faces, as depicted in FIG. 6.

From the loading position (FIG. 1), the carrier 48 is rotated to its horizontal retracted position (FIG. 2). The strip 50 is now in a plane generally parallel to the end of the core panel 13. Thereafter cylinder 58 moves table 34 and correspondingly the carrier 48 with the strip 50 detachably held onto the welding heads 60 to their advanced position (FIG. 7). In this position, the welding element and finger electrode rib longitudinal edge faces 92 and 84 are mutually opposed to each other with the strip apices 50b and core panel apices 51 therebetween. (The welding elements 90 and the finger electrode ribs 82 are exaggerated for clarity in FIG. 7.)

The strip and core panel apices are brought into mutual engagement forming nodes and are aligned relative to one another as the welding heads 60 with the strip 50 detachably held thereon near the advanced position. Vertical alignment is provided by the opposed pairs of guide arms 78 as they project above and below the core panel end to engage the finger electrode ribs 82 of the rear row. (The upper row 14 occupies this position in FIG. 7.) The welding heads align this strip and core panel along the welding station line. As shown most clearly in FIGS. 17 and 19, the cross-sectional configurations of the welding head shoulders 74 are generally similar to the finger electrode forward inclined faces 83. The finger electrodes define a series of receiving pockets 94 into which the welding head shoulders 74 are insertable. Each of these pockets is formed by two electrodes of the forward row (the lower row 16 is in this position in FIG. 17) and one electrode of the rear row therebetween. The strip engages and is aligned by the finger electrode inclined faces 83 as it is carried into these pockets. It is around the forward row that the next transverse row of honeycomb core spaces will be formed by the strip 50 (see FIG. 18). The electrodes of the rear row serve as the electrical contacts with the apices 51 on the end of the core panel 13.

Returning to FIG. 7, welding pressure is applied to the mutually engaging core panel and strip apices as theL carrier 48 nears its advanced position. The strip 50 is brought into engagement with the core panel before guide arms 78 fully interlock with the finger electrode ribs 82. Thereafter, continued advance movement of the carrier 48 drives the welding heads and finger electrodes together to apply welding pressure to the node being welded. As will be appreciated, the welding pressure applied may be varied by increasing or decreasing the fluid pressure in chambers 64. A pressure sensitive element 140 is located in a fluid supply line 66 to the pressure chambers 64. This pressure sensitive element causes welding current to energize the welding elements 90 and the finger electrode rear row when the fluid pressure in the pressure chambers 64 reaches a pressure suitable for welding. It will be recognized that the pistons 62 and their respective fluid filled chambers 64 also act as hydraulic or pneumatic dampers for absorbing impact shock between the core panel and strip.

As most clearly shown in FIG. 16, the finger electrode upper and lower rows 14 and 16 are movable both parallel and perpendicular to the plane of the core panel 13, respectively, by the upper and lower vertical and horizontal cylinders 104, 104', 114 and 114'. Their relative forward and rear positions are interchangeable. The core panel 13 is advanced incrementally out the rear of the apparatus by the relatively forward row as it is moved to the relatively rear position with the former rear row withdrawn from the core panel 13 (see also FIG. 8). The latter is thereafter inserted in the forward position. Such interchanging movement of the finger electrodes is generally illustrated and described in the aforementioned U.S. Pat. No. 2,821,616 to Spott.

As will be appreciated by comparing FIGS. 17 and 19, the finger electrode upper and lower rows 14 and 16 are laterally offset from one another. In the example, the finger electrode upper row 14 is laterally offset relative to the lower row 16 and the welding element array. Hence, when the upper row 14 occupies the relatively rear position and serves as the electrical contacts with the core panel outer nodes, the welding element array must be similarly offset, as depicted in FIG. 17. The web 40, and correspondingly the welding element array, are moved relative to the table 34 parallel to the end of the core panel 13 by the offset cylinder 45 until the welding elements 90 oppose the finger electrode upper row 14. This offsetting movement takes place prior to or simultaneously with advancing movement of the welding element array by the advance-retract cylinder 58. It will be recognized, however, that such offsetting movement is not necessary when the finger electrode lower row 16 occupies the relatively rear position, as depicted in FIG. 19.

Upon completion of the first series of welds across the honeycomb outer nodes, the carrier 48 and correspondingly the welding element array is retracted by cylinder 58. The welding head fingers 80 release their grip on the strip, leaving it partially or totally joined to the outer core panel 13, depending upon the number of welding elements and weld joints to be made. Thereafter, the carrier 48 can be moved relative to the web 40 and table 34 parallel to the end of the core panel 13 by the shift cylinder 52 until the individual welding elements 90 are brought into registry with additional mutually engaging but unwelded nodes. Cylinder 58 then moves the welding element array to and from the welding position for welding together such additional nodes, as depicted in FIG. 18. It will be recognized that the number of times the carrier 48 is shifted may vary depending upon the width of the core panel and the number of welding elements. In the illustrated apparatus utilizing nine welding elements which engage every third strip outer node, the carrier 48 is shifted twice and hence completes 27 weld joints across the end of the core panel 13.

Each of these joints is made up of multiple spot welds. These spot welds are formed simultaneously and hence each weld joint is completed in minimum time. As most clearly shown in FIG. 6, the strip 50 is formed with a series of projections 50a which extend in a line at evenly spaced intervals along its flat apex 50b. These projections serve as the points of engagement with the core panel outer nodes. A spot weld is formed about each projection when welding current and pressure are applied. Inasmuch as each welding element longitudinal edge face 92 engageably backs one strip apex 50b, it spans and is electrically connected with all the strip projections 50a on that strip apex. Thus welding current and pressure are applied simultaneously to all the projections 50a on such strip apex. A series of spot welds respectively corresponding to the series of strip projections 50a is formed simultaneously between the mutually engaging pairs of strip and core panel outer nodes. One, two, or more weld joints can be made at one time. In the illustrated apparatus, nine weld joints, each made up of ten spot welds, are formed simultaneously.

The illustrated projections are arraged in mutually parallel, rectilinear arrays. The number and spacing of the projections will depend, of course, upon the thickness of the core panel 13, the width of the strip and core panel apices, desired welding current density, desired strength of the weld joint and other factors. It may be desirable to form the projections in other arrangements suited for particular core panel designs.

It will be recognized that the form of the welding elements 90 may be varied depending upon the shape of the strip apices with which they are engageable, and upon the arrangement of the strip projections 50a. The welding element faces which engage the strip apices 50b should have profiles which substantially register with the outlines of the strip apices. These faces further should be shaped so as to be conformably engageable therewith. They need not be flat. When used with the illustrated strip (FIGS. 5 and 6), the elongated welding element form with a relatively narrow, flat, longitudinal edge face is preferred. As will be appreciated, the welding element longitudinal edge faces 92 may be thin (generally similar to a knife edge), relatively thicker, or generally similar to a platen depending upon some or all of the above-mentioned factors.

CONTROL SYSTEM

Figure 4:
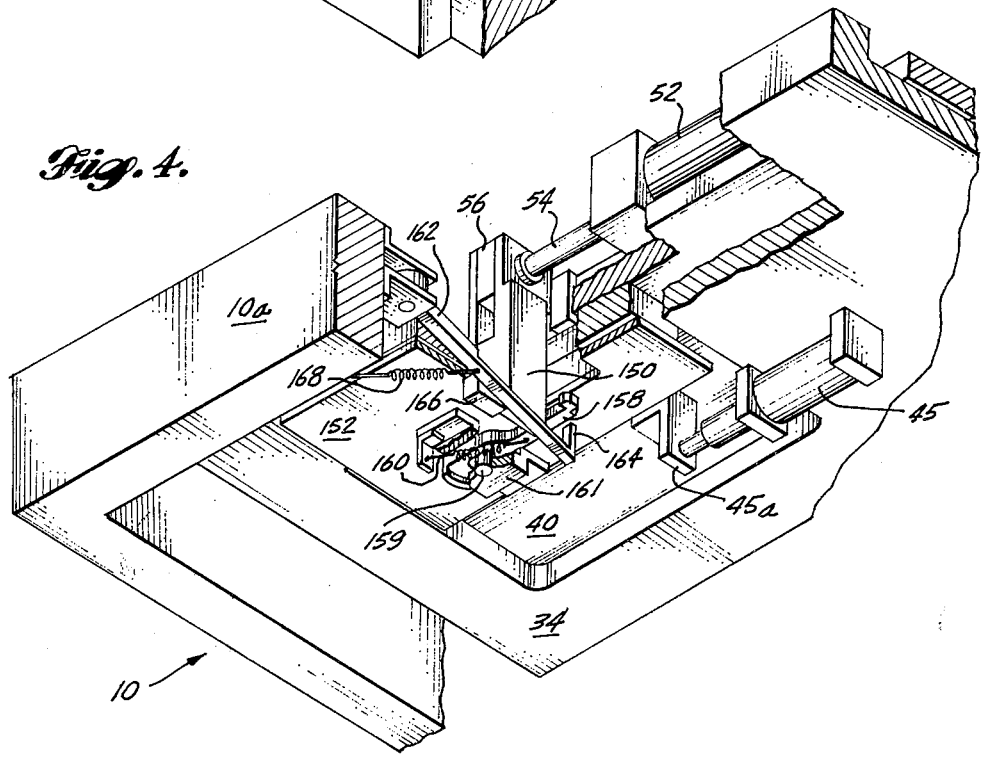
FIG. 4 is a fragmentary perspective view of part of the control system of this invention taken along line 4—4 of FIG. 1.

Referring now in particular to FIG. 4, there is shown a trigger and dog assembly which forms part of the control system. The trigger and dog assembly is comprised of a downwardly projecting stop plate 150, the upper end of which is bifurcated and rotatively coupled with the T-bracket 56 and the connecting rod 54. The lower end of the stop plate 150 projects through an opening in a horizontal plate 152 dependedly mounted from the underside of the web 40. The lower rear edge of the stop plate 150 engages a hook shaped trigger 158 dependedly rotatively mounted from the underside of the horizontal plate 152 upon a pivot pin 159 and secured to the plate 152 by a U-shaped bracket 161. A slot 158a (see FIGS. 9–13) in the trigger 158 through which the pin 159 extends is so formed that the trigger 158 is slidably movable parallel to the end of the core panel along the pivot pin 159. The trigger is counter-clockwise biased by a spring 160 into engagement with the stop plate 150, as shown (FIG. 4).

Figure 20:
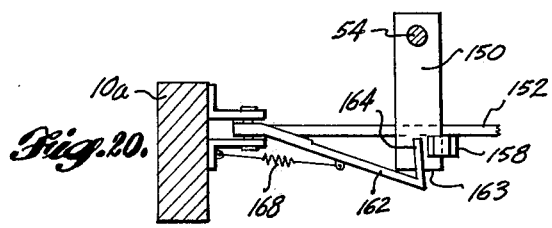
FIGS. 20, 21 and 22 are side elevations of the control system of FIG. 4 during operation.
Figure 21:
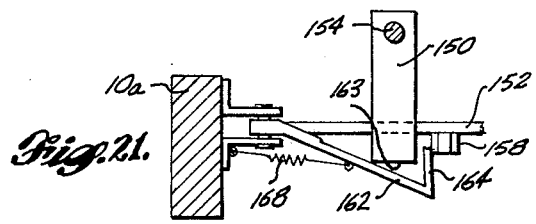
Figure 22:
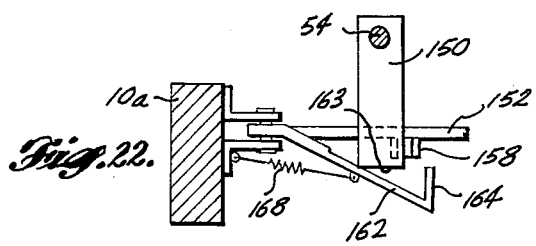

As best shown in FIGS. 20–22, a generally L-shaped dog release 162 having an upturned end 164 is pivotally supported from the base frame front 10a. The stop plate 150 terminates in a lower end face 163 adjacent a shoulder 166 (FIG. 4) against which the dog release 162 is biased by a spring 168. The dog release 162 is inclined relative to the stop plate lower face 163. As the stop plate 150 is moved along with the carrier 48 to and from the above described advanced position (or relatively to and from the main frame front 10a) the stop plate lower face 163 slides back and forth along the dog release 162, the upturned end of which correspondingly moves up and down, as shown (FIGS. 20–22). The dog release is so disposed that its upturned end 164 is engageable with the end of the trigger 158.

For purposes of illustration in describing the control system according to the present invention, the finger electrode lower or bottom row 16 is described hereinafter as being initially forward of the finger electrode upper or top row 14 with the carrier 48 in its leftmost position, as depicted in FIG. 17. The carrier control circuit (FIG. 14) and the finger electrode control circuit (FIG. 15) are energized with electrical power over common input and output lines 170 and 172.

A sequencer switch S1 (FIG. 14) engages a lower contact 180 in response to the finger electrode bottom row 16 being in its forward position (FIG. 17). A relay R1 is energized with current flowing from the input line 170, and through line 182, the switch S1, lower contact 180, normally closed relay contacts R2-1 and one branch of line 184. Relay R1 closes relay contacts R1-1 and R1-2 through which current respectively passes along lines 188 and 184 to energize an offset right actuator 186 and to establish a holding circuit to the relay R1. The relay R1 also opens normally closed relay R1-3. This prevents relay R2 from being energized until the relative forward and rear positions of the finger electrode upper and lower rows are completely interchanged. The now energized offset right actuator 186 causes pressure fluid to actuate the offset cylinder 45 which moves the web 40 to the right, parallel to the end of the assembled core 13, as depicted in FIG. 17, until the welding elements 90 and the finger electrode top row 14 (i.e. the relatively rear row) are mutually opposed.

Figure 9:
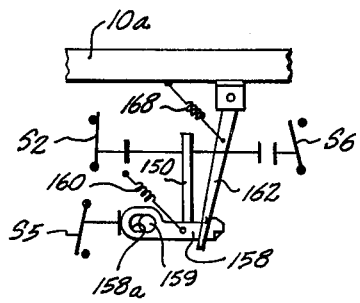
FIGS. 9–13 are schematic outlines of the control system of FIG. 4 depicted at various positions during a welding cycle.

As depicted in FIG. 9, switch S2 was closed when the stop plate 150 was moved to its leftmost position along with the carrier 48. Current flowing through switch S2 (see FIG. 14) along line 192 energizes relay R3, which closes relay contacts R3-1. Current flows through these relay contacts along line 191 and normally closed contacts R6-5 to energize an advance actuator 190. This actuator causes pressure fluid to actuate the advance-retract cylinder 58 which advances the carrier 48 toward the end of the assembled core 13.

The pressure sensitive element 140 described hereinabove for sensing fluid pressure in the carrier pressure chambers 64 typically is a pressure responsive switch. This switch is closed when fluid pressure in the pressure chambers 64 and correspondingly contact pressure between the strip 50 and the core panel reaches a pressure suitable for welding. Current then flows through the now closed pressure responsive switch 140 (see FIG. 14) over line 194 to energize relay R4. This relay closes relay contacts R4-1 through which current flows along line 194 to energize a welding circuit 198. The welding circuit 198 is or can be of conventional design for supplying welding current to the individual welding elements over their respectively associated power leads 195. (See FIGS. 1, 5 and 7.)

Still referring to FIG. 14, a reverse switch S3 (see also FIG. 17) is engaged and closed by the carrier 48 when it reaches its advanced position. Current flows through the now closed reverse switch S3 from input line 170 over line 200 to energize relay R6 which in turn closes relay contacts R6-1, R6-2, R6-3, R6-4 and opens normally closed contact R6-5. Relay contact R6-1 closes a holding circuit through the still closed switch S2 and lines 201 and 200 to the relay R6. Current flows from line 170 through the closed contact R6-2 and line 203 to energize a retract actuator 204. The latter causes pressure fluid to actuate the advance-retract cylinder 58 which retracts the carrier 48, as depicted in FIG. 16. The advance actuator 190 is disabled because the now opened contact R6-5 blocks current from flowing thereto along the line 191. Return switch S4 (see also FIG. 18) is closed in response to the carrier 48 reaching its retracted position. Current from line 170 now flows through the return switch S4 and the now closed relay contacts Rb-3 and line 209 to energize shift right actuator 210 which causes pressure fluid to actuate the shift cylinder 52. This cylinder moves the carrier 48 to the right, as depicted in FIG. 18.

Figure 10:
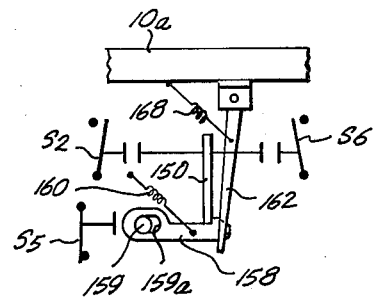

Referring now to FIGS. 9 and 10, the stop plate 150 is moved to the right conjointly with the carrier 48. Movement of the stop plate 150 opens the switch S2. Opening of switch S2 opens the holding circuit and causes deenergization of relay R6. Relay contacts [R6-1]-[R6-5] are allowed to return to their normal illustrated positions. As depicted in FIG. 10, the trigger hooked end engages and is moved with the stop plate 150. The trigger is moved along the pivot pin 159 the length of the slot 158a. This movement of the trigger 158 closes switch S5. Referring again to FIG. 14, current now flows from line 170 through the now closed switch S5 and lines 211, 212 and 192 to again energize the relay R3. This relay causes advancement and retraction of the carrier 48 a second time as already described.

Figure 11:
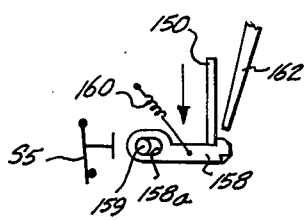
Figure 12:
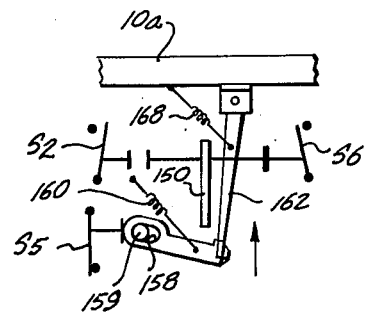

Referring now to FIGS. 11-13 and 20-22, the trigger 158 and stop plate 150 are advanced and retracted with the carrier 48, as depicted in FIG. 11, or moved to and from the base frame front 10a (see FIGS. 20-22). The dog release 162 engages and rotates the trigger projection 158a near the end of this retractive movement, as depicted in FIGS. 12 and 20-21, causing the trigger 158 to become disengaged from the stop bar 150. The trigger 158 then is pulled back along its slot 158a by the spring 160 to again open switch S5, as depicted in FIGS. 12 and 22.

Figure 13:
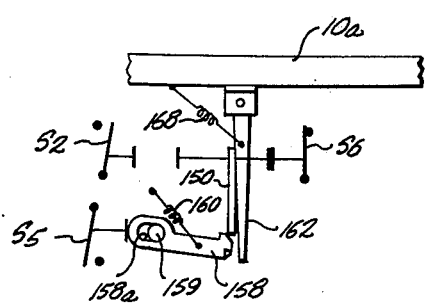

The return switch S4 again is closed in response to the carrier 48 reaching its retracted position. The carrier is shifted to the right a second time (FIG. 18) by the shift right actuator 210, as already described. Switch S6 is now closed by the stop plate 150, as depicted in FIG. 13. Referring to FIG. 14, it will be seen that current now flows from line 170 through switch S6 and lines 214, 212, and 192 to again energize the relay R3, which when so energized causes the aforementioned advancement and retraction of the carrier 48. At the termination of the latter retractive movement of the carrier 48 the holding circuit to relay R6 through S6 is opened by actuating the shift cylinder 52 using means not shown to move the carrier 48 and the stop plate 150 leftwardly back to their initial positions (thus opening switch S6), as depicted in FIG. 18.

The finger electrode control circuit is shown schematically in FIG. 15. Switch S8 (FIG. 14) is closed in response to retraction of the carrier 48 after the termination of the third welding sequence. Current flows from line 170 through switch S8, line 216 and the closed relay contact R6-4 to energize relay R9 (FIG. 14). (Relay R6 remains energized long enough after the third welding sequence for relay contacts R6-4 to be kept closed to allow relay R9 to be energized.) The relay R9 closes relay contact R9-1 of the vertical electrode control circuit (FIG. 15) which is thus energized with current from the common input line 170.

Referring now to FIGS. 15 and 16, switch S19 is closed in response to the upper row 14 being in its advanced-lowered position depicted in solid lines in FIG. 16 Current flows from line 170 through top line 217, normally closed contacts R2-4 and now closed switch S19 to energize latching relay R10. The latching relay R10 closes relay contacts R10-1, R10-2, R10-3 and R10-4 and opens normally closed relay contacts R10-5 and R10-6. Current flows through now closed contacts R10-1 and line 220 to energize actuator 222. This actuator causes pressure fluid to actuate the upper vertical cylinder 104. The finger electrode top row 14 is elevated by the upper cylinder 104 to the advanced elevated position 14a (FIG. 16).

Switches S12 and S14 (FIG. 15) are closed in response to the finger electrode top row 14 reaching the advanced elevated position. Current flows from line 170 through the now closed switch S12, relay contacts R10-2 and line 221 to energize relay R12 which in turn closes relay contacts R12-1, R12-2 and R12-3 (FIG. 15). The now closed contacts R12-2 provide a holding circuit to the relay R12 through line 223. Current flows from the line 170 through the now closed contacts R12-1 and R10-3 and line 224 to energize actuator 26o which causes pressure fluid to actuate the lower horizontal cylinder 114'. This cylinder advances the bottom row 16 along with the core panel 13 to its advanced raised position 16a (FIG. 16).

Switches S13 and S16 are closed in response to the finger electrode bottom row 16 reaching the advanced raised position. Current flows from line 170 through the now closed switch S13 and relay contacts R10-4 over line 228 to energize latching relay R20 which in turn opens relay contacts R10-1, R10-2, R10-3, and R10-4 and closes relay contacts R10-5 and R10-6. Current now flows from the supply line 170 through the now closed switch S14 (which was closed when the upper row 14 reached its advanced raised position 14a) and the now closed relay contacts R10-5 along line 225 to energize actuator 230. The latter causes pressure fluid to actuate the upper horizontal cylinder 114 which moves the finger electrode top row 14 to the retracted elevated position 14b (FIG. 16).

Switch S15 is closed in response to the top row 14 reaching the retracted elevated position. Current flows from line 170 through the now closed switch S15 and relay contacts R10-6 along line 226 to energize actuator 232 which causes pressure fluid to actuate the upper vertical cylinder 104. The latter lowers the finger electrode top row 14 which is inserted between the outer core panel apices. Simultaneously, upon closure of switch S15, time delay relay R21 is energized by current flowing through branch line 227 and closed relay contacts R12-3. The time delay relay thereafter deenergizes the circuits of FIGS. 14 and 15 upon completion of movement of the top row 14.

The relative forward and rear positions of the finger electrodes are now interchanged (FIG. 17). The circuit of FIG. 14 is again energized and the carrier 48 is returned to its leftmost initial position by means not shown. Referring to FIG. 14, sequencer switch S1 now engages the upper contact 228. Relay R2 is energized with current flowing from input line 170, line 182, upper contact 181, line 262, and normally closed relay contact R1-3. Relay R2 closes relay contacts R2-2 and R2-3 (FIG. 15) and opens normally closed contacts R2-1 and R2-4 (FIG. 15). Opening of the normally closed contacts R2-1 prevents relay R1 from being energized until the finger electrode upper and lower rows are completely interchanged. A holding circuit is established to relay R2 along line 229 through the now closed contacts R2-2. Operation of the carrier control circuit (FIG. 14) and the welding apparatus is thereafter generally similar to that already illustrated and described except that the carrier 48 is advanced toward the assembled core without the above described lateral offsetting movement, as depicted in FIG. 19.

At the termination of the third weld of the welding cycle, the finger electrode control circuit (FIG. 15) operates to again transpose the vertical rows of electrodes in a generally similar manner illustrated and described, except that in this instance the lower four actuators 238, 244, 250 and 256 of FIG. 15 are sequentially energized instead of the top four 232, 230, 260 and 222. This sequence was initiated by relay R2 which opened normally closed relay contacts R2-4 (FIG. 15) and closed relay contacts R2-3 (FIG. 15).

Switch S16 also was closed in response to the bottom row of electrodes 16 reaching its advanced-raised position 16a as depicted in FIG. 16. Current flows from line 170 through the now closed relay contacts R2-3 and switch S16 along line 234 to energize a latching relay R22. Latching relay R22 closes relay contacts R22-1, R22-2, R22-3, and R22-4 and opens normally closed contacts R22-5 and R22-6.

Current flows from line 170 through the now closed relay contacts R22-1 along line 236 to energize actuator 238. The latter causes pressure fluid to actuate the lower vertical cylinder 104' to lower the bottom row 16 to its advanced-lowered position 16b as depicted in FIG. 16.

Switches S17 and S18 are closed when the bottom row 16 reaches this position. Current flows from line 170 through now closed switch S17 and closed relay contacts R22-2 along line 240 to energize relay R24. Relay R24 closes relay contacts R24-1, R24-2, and R24-3. The closed relay contacts R24-2 provide a holding circuit including line 241 to the relay R24. Current flows from line 170 through the now closed relay contacts R24-1 and R22-3 along line 242 to energize actuator 244 which in turn causes pressure fluid to actuate the upper horizontal cylinder 114 for moving the top row 14 to its advanced-lowered position, depicted in solid lines in FIG. 16. The assembled core 24 is advanced rearwardly therewith.

Switches S19 and S20 are closed in response to top row 14 reaching this position. Current flows through the now closed switch S20 and closed relay contacts R22-4 along line 246 to energize the relay R26. Relay R26 opens relay contacts R22-1, R22-2, R22-3, and R22-4 and closes relay contacts R22-5 and R22-6. Current now flows through again closed relay contacts R22-5 and switch S18 (which was closed when the bottom row 16 reached its advanced-lowered position 16b) along line 248 to energize actuator 250. The latter causes pressure fluid to actuate the lower horizontal cylinder 114' which moves the bottom row 16 to its retracted lowered position 16c as depicted in FIG. 16.

Switch S22 is closed in response to the bottom row 16 reaching this position. Current flows from line 170 through the switch S22 and now closed relay contacts R22-6 along line 254 to energize actuator 256 which causes pressure fluid to actuate the lower vertical cylinder 104'. This cylinder raises the bottom row 16 to its elevated retracted position depicted in solid lines in FIG. 16. Current also flows along line 254 to branch line 256 and through previously closed relay contacts R24-3 to again energize the time delay relay R21. The time delay relay R30 thereafter deenergizes the circuit of FIGS. 14 and 15. It will be appreciated that various modifications and/or changes can be made in the embodiment described herein without departure from the spirit or scope of the present invention. It is to be understood, therefore, that the foregoing description and drawings are illustrative only of a preferred embodiment, not limiting, and that the true spirit and scope of the present invention will be determined by reference to the appended claims.

What is claimed is:

1. Welding apparatus for making honeycomb core panels from corrugated metal strips, said strips having raised projection arrays thereon comprising:

a base on which the core panel under fabrication is positionable with one end thereof substantially coincident with a welding station extending across the base;

first movable electrode means insertable within and retractable upwardly from core cells adjacent said welding station to establish electrical contact with inwardly facing surfaces of outer apices on said core, said first electrode means further movable between a first, strip engaging, position to a second welding position while engaged with said core whereby said core is advanced through said apparatus;

second movable electrode means insertable within and retractable downwardly from core cells adjacent said welding station to establish electrical contact with inwardly facing surfaces of outer apices on said core, said second electrode means further movable between a first, strip engaging, position to a second welding position while engaged with said core whereby said core is advanced through said apparatus;

welding means movable on said base from a strip-receiving location to said welding station, said welding means including strip positioning means to receive and carry a corrugated metal strip into registry with said core with said raised projection arrays between said strip and said core whereby honeycomb cells are formed and further including at least one welding element engageable with the apices of said strip to impose welding current simultaneously across all said raised projection arrays at a node, to form a series of spot welds at said node;

means to move said first and said second movable electrode means in a sequence from strip engaging position wherein said welding means brings said strip into contact with said electrode means to a welding position wherein said strip is welded to said core forming cells, then return to said strip engaging position by withdrawing said electrode means from said cells, said means to move said first and said second movable electrode means alternatively moving said first and said second electrode means in said sequence; and means to impose a welding current between said welding elements and said electrodes.

2. The apparatus according to claim 1, wherein said welding means further is movable on the base so that its face engageably backs other strip apices which are spaced along said welding station line from said one strip apex.

3. The apparatus according to claim 1, wherein said welding means includes a welding element essentially elongated in form, and having a substantially flat longitudinal edge face conformably engageable with one strip apex, said welding means being so disposed at said welding station that said welding element engageably backs said one strip apex.

4. The apparatus according to claim 3, wherein said welding means further comprises a plurality of elongated welding elements having substantially flat longitudinal edge faces having profiles substantially registering with the outlines of said strip apices with which said longitudinal edge faces are conformably engageable, said welding elements being disposed in a generally rectilinear array in which said longitudinal edge faces are substantially coincident with a common plane, and in which said welding elements are substantially mutually parallel.

5. The apparatus according to claim 4, wherein the welding means is movable jointly as said array to and from said welding station and in which said longitudinal edge faces front collectively along a welding station line, and wherein said strip positioning means is further operable for positioning a fresh strip relative to said array, the disposition of the strip relative to said array being such that said longitudinal edge faces engageably back said strip apices.

6. The apparatus according to claim 5, wherein said strip positioning means is further operable for positioning a fresh strip onto said array, with said array removed from said welding station, and for detachably holding the fresh strip on said array as said array is moved to said welding station, said array being so disposed at said welding station that said longitudinal edge faces and said core panel apices mutually oppose each other, with said mutually engaging core panel and strip apices therebetween.

7. The apparatus according to claim 6, wherein said strip positioning means comprises a plurality of welding heads, a welding element being mounted on each welding head, each welding head including a body shaped to be conformably engageable with a portion of the underside of the strip adjacent one of its outer apices and terminating in an edge portion which underlies an outer apex of the strip when the strip is positioned on the array, the longitudinal edge face of the welding respective element projecting outwardly from said body along said edge portion.

8. The apparatus according to claim 7, wherein said strip positioning means further comprises: an arm means for engaging one longitudinal edge of the strip, a resilient finger means for engagement with the other longitudinal edge of the strip for resiliently detachably gripping the strip therebetween, the arm means and resilient finger means being spaced from each other substantially the length of the welding element, and projecting outwardly from said body adjacent each end of the welding element.

9. The apparatus according to claim 1, further comprising means for reciprocatively supporting said welding element from the base, and means for applying pressure to said reciprocative means, and thereby to said welding element, and wherein said energizing means is responsive to the pressure applied for initiating and terminating welding.

10. The apparatus according to claim 1, wherein the base comprises: a main frame, a table supported by said main frame, said table being movable relative to said main frame perpendicular to said welding station line, a web supported from said table, and movable thereon perpendicular to said welding station line, said welding element mounted on said web and movable relative to said web parallel to the welding station line, said welding element being disposed for movement to and from said advanced position corresponding to movement of said main frame relatively toward and away from said welding station line.

11. The apparatus according to claim 10, further comprising a table reciprocative element for moving the table relatively toward and away from said welding station line, and means to move said welding means relative to the web parallel to the welding station line, actuator means operable for actuating said means to move said welding means to move said welding element parallel to said welding station line subsequent to movement of said welding means relatively away from said welding station line by said table reciprocative element, and thereafter to again actuate said table reciprocative element, so as to apply said welding element against others of said strip apices.

12. The apparatus according to claim 11, wherein said actuator means includes control means responsive to the position of said welding element relative to the web for actuating said welding element reciprocative element.

* * * * *